United States Patent [19]

Deguchi et al.

[11] Patent Number: 4,558,094
[45] Date of Patent: Dec. 10, 1985

[54] PROCESS FOR PRODUCING A CROSSLINKED PRODUCT OF A SILANE GRAFTED PROPYLENE RESIN

[75] Inventors: Jichio Deguchi; Takayuki Inoue, both of Yokkaichi, Japan

[73] Assignee: Mitsubishi Petrochemical Co., Ltd., Tokyo, Japan

[21] Appl. No.: 561,727

[22] Filed: Dec. 15, 1983

[30] Foreign Application Priority Data

Dec. 22, 1982 [JP] Japan ................................ 57-225295

[51] Int. Cl.$^4$ ............................................. C08L 51/06
[52] U.S. Cl. ........................................ 525/71; 525/72
[58] Field of Search ................................... 525/72, 71

[56] References Cited

U.S. PATENT DOCUMENTS 3,804,919 4/1974 Schrage et al. ...................... 525/72
4,444,974 4/1984 Takase et al. ....................... 525/477

FOREIGN PATENT DOCUMENTS 0148044 11/1979 Japan ................................... 525/72
0104338  8/1980 Japan ................................... 525/72
0023651  2/1982 Japan ................................... 525/71

*Primary Examiner*—Wilbert J. Briggs, Sr.
*Attorney, Agent, or Firm*—Robert E. Burns; Emmanuel J. Lobato; Bruce L. Adams

[57] ABSTRACT

Crosslinked product of a propylene resin having practically sufficient performances such as heat resistance, impact strength, rigidity, etc. is produced by exposing a composition to water or steam in the presence of a silanol condensation catalyst to effect crosslinking, the composition being comprised of (A) 60 to 90 wt % of a modified propylene resins with an ethylenically unsaturated silane compound grafted thereon, (B) 20 to 5 wt % of an ethylene resin and (C) 20 to 5 wt % of an ethylene-α-olefin copolymer rubber.

26 Claims, No Drawings

PROCESS FOR PRODUCING A CROSSLINKED PRODUCT OF A SILANE GRAFTED PROPYLENE RESIN

FIELD OF THE INVENTION

The present invention relates to a process for producing a crosslinked product of a propylene resin. More particularly, it relates to a process for producing a crosslinked product made of a modified propylene resin prepared by grafting an ethylenically unsaturated silane compound onto a propylene resin.

BACKGROUND OF THE INVENTION

A process which comprises grafting an ethylenically unsaturated silane compound onto an ethylene resin such as a polyethylene or a copolymer comprising ethylene in the presence of a radical initiator to prepare a modified ethylene resin and exposing the modified ethylene resin to water or steam in the presence of a silanol condensation catalyst to crosslink the resin, whereby physical properties such as heat resistance, creep resistance, environmental stress cracking resistance and resistance to chemicals can be markedly improved, is known from, for example, Japanese Patent Publication No. 1711/73. This crosslinking process has advantages over the conventional process which uses a chemical crosslinking agent or an electron beam in that the cost for equipment can be markedly reduced and the crosslinking operation is comparatively easy. Due to those industrial advantages, studies are being made actively to put this process into practical use in the fields of wire covering, pipes, films, and shrinkable tubes.

On the other hand, with respect to a propylene resin such as a polypropylene, it is predicted that excellent characteristics of heat resistance, high strength and high rigidity in addition to the same effects as in the case of the ethylene resin due to the excellent physical properties that the propylene resin inherently possesses can be obtained by crosslinking the propylene resin in the same manner as in the ethylene resin, and it is therefore expected that the expansion of the amount thereof and the applied fields would be very large.

In view of the above, the present inventors tried the above-mentioned crosslinking process for propylene resin. The resulting crosslinked product of the propylene resin was found to be greatly improved in heat resistance and other properties, but the impact resistance and rigidity were not sufficiently improved from the standpoint of practical use.

As a result of various investigations to overcome the above problems, it has been found that a crosslinked product of propylene resin having an excellent heat resistance and also practically sufficient performance in the impact strength and rigidity which are conflicting characteristics can be obtained by crosslinking a composition prepared by blending an ethylene resin and an ethylene-α-olefin copolymer rubber with a modified propylene resin with an ethylenically unsaturated silane compound grafted thereon.

Accordingly, an object of this invention is to provide a process for producing a crosslinked product of a propylene resin which comprises exposing a composition comprising (A) 60 to 90 wt % of a modified propylene resin with an ethylenically unsaturated silane compound grafted thereon, (B) 20 to 5 wt % of an ethylene resin, and (C) 20 to 5 wt % of an ethylene-α-olefin copolymer rubber, to water or steam in the presence of a silanol condensation catalyst to crosslink the composition.

DETAILED DESCRIPTION OF THE INVENTION

Examples of the propylene resin used in this invention include a propylene homopolymer, a random or block copolymer of the propylene and about 30 wt % or less of another α-olefin such as ethylene or butene-1, and mixtures thereof. Of those, a propylene homopolymer and propylene-α-olefin block copolymer are preferred from the standpoint of the rigidity of the crosslinked product.

The propylene resin has preferably a melt flow index of 0.7 g/10 min or less from the standpoint of increasing the gel content in the crosslinked product. The particularly preferred melt flow index is 0.3 g/10 min or less.

The ethylenically unsaturated silane compound used in this invention is a silane compound represented by the formula

$$RSiR'_nY_{3-n}$$

wherein R is an ethylenically unsaturated hydrocarbon group or a hydrocarbon oxy group, R' is an aliphatic saturated hydrocarbon group, Y is a hydrolyzable organic group, and n is 0, 1, or 2.

Representative examples of the silane compound are those wherein R is vinyl, allyl, isopropenyl, butenyl, cyclohexenyl or γ-methacryloyloxypropyl, R' is methyl, ethyl, propyl, decyl or phenyl, and Y is methoxy, ethoxy, formyloxy, acetoxy, propionyloxy, alkylamino or arylamino.

Particularly preferred silane compounds are represented by the formula

$$CH_2=CHSi(OA)_3$$

wherein A is a hydrocarbon group having 1 to 8 carbon atoms.

Examples of such preferred compounds include vinyltrimethoxysilane, vinyltriethoxysilane, vinyltriacetoxysilane and γ-methacryloyloxypropyltrimethoxysilane.

The ethylenically unsaturated silane compound is grafted onto a propylene resin to form the modified propylene resin in the conventional manner such that 0.1 to 10 parts by weight of the silane compound, 0.01 to 2.0 parts by weight of a radical initiator, and 0 to 5 parts by weight of an antioxidant are added to 100 parts by weight the propylene resin, and the resulting composition is mixed using an extruder or Banbury mixer at a temperature above the decomposition point of the radical initiator to effect graft reaction.

The radical initiator which can be used in this invention is any compound that causes the propylene resin to generate free radical portions under the graft reaction conditions. All the compounds described in the above-mentioned Japanese Patent Publication No. 1711/73 can be used.

Typical examples of the radical initiator include organic peroxides such as dicumyl peroxide, t-butylperoxy octate and benzoyl peroxide, and azo compounds such as azoisobutyronitrile and methylazoisobutyrate.

The modified propylene resin according to this invention contains the silane compound in an amount of 0.001 to 10 wt %, preferably 0.01 to 10 wt %, most preferably 0.5 to 5 wt %, based on the weight of the modified polypropylene resin. It is essential for this invention to blend the ethylene resin and ethylene-α-olefin copolymer rubber with the modified propylene resin.

Examples of the ethylene resin used in this invention include, for example, low-, middle- and high-density polyethylene, copolymers of ethylene and about 30 wt % or less of other α-olefin such as propylene and butene-1, copolymers of ethylene and about 30 wt % or less of a vinyl monomer such as vinyl acetate, methacrylic acid and methacrylic ester, and mixtures thereof.

The density of the ethylene resin is preferably 0.930 g/cm$^3$ or more, most preferably 0.945 g/cm$^3$ or more, from the standpoint of the rigidity of the crosslinked product.

The ethylene resin used in this invention may be graft-modified with the ethylenically unsaturated silane compound as in the case of the propylene resin.

Examples of the ethylene-α-olefin copolymer rubber used in this invention include, for example, ethylene-propylene rubber, ethylene-butene-1 rubber, ethylene-propylenediene rubber and ethylene-butene-1-diene rubber.

The ethylene-α-olefin copolymer rubber may be graft-modified with the ethylenically unsaturated silane compound as in the case of the propylene resin.

The composition used in this invention is prepared by blending the propylene resin, the ethylene resin and the ethylene-α-olefin copolymer rubber in the proportion of 60 to 90 wt %, 20 to 5 wt % and 20 to 5 wt %, preferably 70 to 88 wt %, 15 to 7 wt % and 15 to 5 wt %, respectively. In the case where the ethylene resin alone or the ethylene-α-olefin copolymer rubber alone is blended, or in the case where both the ethylene resin and the ethylene-α-olefin copolymer rubber are blended but the amounts thereof are outside the above-specified ranges, the resulting crosslinked product is not satisfactory in impact strength and rigidity. Further, the ethylene resin and ethylene-α-olefin copolymer rubber may be graft-modified with the silane compound as described before, but even if a composition prepared by blending the ethylene resin and ethylene-α-olefin copolymer rubber with the propylene resin is graft-modified with the silane compound, good results can not be obtained.

According to the process of this invention, the composition which may contain a filler, colorant, slip agent, stabilizer, etc., if desired, is molded into a desired shape, and the molding thus prepared is exposed to water or steam in the presence of the silanol condensation catalyst to effect crosslinking. The resulting crosslinked product has preferably a gel content of 50% or more.

The silanol condensation catalyst includes, for example, dibutyltin dilaurate, dibutyltin diacetate, and dibutyltin dioctoate as disclosed, for example, in the above-described Japanese Patent Publication No. 1711/1973.

The catalyst is incorporated into the composition prior to molding, or applied to or impregnated into the molding in the form of solution or dispersion.

The silanol condensation catalyst is used in an amount of 0.001 to 10 parts by weight, preferably 0.01 to 5 parts by weight, per 100 parts by weight of the modified propylene resin.

The composition is molded into a desired shape and the molding is exposed to water by contacting the molding with water (in the form of liquid or steam) at a temperature of from room temperature to about 200° C., preferably room temperature to about 100° C., for about 10 seconds to about 1 week, preferably about 1 minute to about 1 day.

The invention is described in more detail by reference to the following examples, in which the impact strength was measured according to JIS K7110 (Izod with notch), flexural modulus was measured according to JIS K7203 (three-point bending test), and gel content and deformation under heating and pressure were measured according to the following methods.

Gel content:

A sample of crosslinked product is extracted with xylene using a Soxhlet extractor at a temperature of the boiling point for about 24 hours. The weight of the unextracted residues is expressed in terms of percentage according to the following formula:

$$\text{Gel content (\%)} = \frac{\text{Weight of unextracted residues (g)}}{\text{Weight of sample before extraction (g)}} \times 100$$

Deformation under heating and pressure:

A test piece having a length of 10 mm and a width of 10 mm cut out from a crosslinked product in the form of 2 mm thick sheet is held between pressing plates in a silicone bath at 180° C. A 3 kg load is placed to apply pressure to the test piece for 1 hour. The change of the thickness of the test piece is measured with a dial gauge, and the deformation under heating and pressure (%) is calculated according to the following formula:

$$\text{Deformation under heating and pressure (\%)} = \frac{\text{Change in thickness of test piece (mm)}}{\text{Thickness of test piece (2 mm)}} \times 100$$

EXAMPLE 1

A composition of 80 wt % of a modified propylene resin ($A_1$), 12 wt % of an ethylene resin ($B_1$) and 8 wt % of an ethylene-α-olefin copolymer rubber ($C_1$) was blended with a masterbatch containing 100 parts by weight of a polypropylene ($A_0$) and 1 part by weight of dibutyltin dilaurate in the weight ratio of 19:1. The resulting composition was injection molded into a test piece.

The test piece was dipped in hot water at 98° C. for 50 hours to obtain a crosslinked product.

Impact strength, flexural modulus, deformation under heating and pressure, and gel content of the crosslinked product were measured.

The results obtained are shown in Table 1 below.

EXAMPLES 2 to 5 and COMPARATIVE EXAMPLES 1 to 9

Crosslinked products were prepared from the compositions of various formulations as shown in Table 1 below.

In Examples 2 to 5 and Comparative Examples 3 to 5 and 7 to 9, the masterbatch was added and after molding, water treatment was performed in the same manner as in Example 1.

In Comparative Examples 1, 2 and 6, the masterbatch was not added and the water treatment was not performed.

The results obtained are shown in Table 1.

TABLE 1

| | Composition | | | | | | | Impact strength (kg·cm/cm) | Flexural modulus (kg/cm²) | Deformation under heating & pressure (%) | Gel content (%) |
|---|---|---|---|---|---|---|---|---|---|---|---|
| | Modified propylene plastics (A) | | Ethylene plastics (B) | | Ethylene-α-olefin copolymer rubber (C) | | | | | | |
| | Type | Amount | Type | Amount | Type | Amount | Note | | | | |
| Example | | | | | | | | | | | |
| 1 | A₁ | 80 | B₁ | 12 | C₁ | 8 | | >45 | 16,800 | 13 | 86 |
| 2 | A₂ | 80 | B₁ | 12 | C₁ | 8 | | >45 | 16,500 | 10 | 88 |
| 3 | A₂ | 80 | B₀ | 12 | C₁ | 8 | | >45 | 15,500 | 15 | 80 |
| 4 | A₂ | 80 | B₁ | 12 | C₀ | 8 | | >45 | 16,000 | 15 | 84 |
| 5 | A₂ | 80 | B₀ | 12 | C₀ | 8 | | >45 | 15,000 | 15 | 77 |
| Comparative Example | | | | | | | | | | | |
| 1 | A₀ | 100 | — | — | — | — | (1) | 4 | 12,000 | 100 | — |
| 2 | A₀ | 80 | B₀ | 12 | C₀ | 8 | (2) | 8 | 9,000 | 100 | — |
| 3 | A₂ | 100 | — | — | — | — | | 6 | 20,000 | 8 | 93 |
| 4 | A₂ | 80 | B₁ | 20 | — | — | | 8 | 12,000 | 9 | 88 |
| 5 | A₂ | 80 | — | — | C₁ | 20 | | 11 | 9,800 | 20 | 86 |
| 6 | A₂ | 80 | B₁ | 12 | C₁ | 8 | (3) | 10 | 11,000 | 75 | — |
| 7 | A₀ | 80 | B₀ | 12 | C₀ | 8 | (4) | 8 | 11,000 | 20 | 75 |
| 8 | A₂ | 94 | B₁ | 3 | C₁ | 3 | | 8 | 18,000 | 11 | 89 |
| 9 | A₂ | 50 | B₁ | 25 | C₁ | 25 | | >45 | 8,000 | 30 | 75 |

Notes:
(1) Water treatment was not carried out.
(2) Water treatment was not carried out.
(3) Water treatment was not carried out.
(4) Graft-modification was carried out after blending.

The symbols A₀, A₁, A₂, B₀, B₁, C₀ and C₁ used in Table 1 denote the following resins.

A₀: Polypropylene having a density of 0.90 g/cm³ and a melt flow index of 0.20 g/10 min. ("Noblen" made by Mitsubishi Petrochemical Co., Ltd.)

A₁: Modified propylene resin with a silane compound grafted thereon, having a melt flow index of 1.8 g/10 min. and containing 2.6 wt % of the silane compound. Prepared by blending 100 parts by weight of the polypropylene (A₀) with 0.5 part by weight of benzoyl peroxide and 3 parts by weight of vinyltrimethoxysilane for 2 minutes using a mixer, followed by melt-mixing the mixture with an extruder (40 mm in diameter and L/D 25) at 210° C.

A₂: Modified propylene resin with a silane compound grafted thereon, having a melt flow index of 1.5 g/10 min. and containing 2.2 wt % of the silane compound. Prepared by adding 0.2 part by weight of antioxidant tetrakis[methylene-3-(3,5-di-t-butyl-4-hydroxyphenyl)-propionate]methane in the course of production of A₁.

B₀: Polyethylene having a density of 0.96 g/cm³ and a melt flow index of 20 g/10 min. ("Yukalon HD JX10" made by Mitsubishi Petrochemical Co., Ltd.)

B₁: Modified ethylene resin with a silane compound grafted thereon, having a melt flow index of 12 g/10 min. and containing 1.6 wt % of the silane compound. Prepared by blending 100 parts by weight of the polyethylene (B₀) with 0.05 part by weight of dicumyl peroxide and 2 parts by weight of vinyltrimethoxysilane for 2 minutes using a mixer, followed by melt-mixing the mixture with an extruder (40 mm in diameter and L/D 25) at 220° C.

C₀: Ethylene-propylene copolymer rubber having a Mooney viscosity of $ML_{1+4}$(100° C.) 24 and containing 26 wt % of propylene.("EP02" made by Japan Synthetic Rubber Co., Ltd.)

C₁: Modified ethylene-α-olefin copolymer rubber with a silane compound grafted thereon, having a Mooney viscosity of $ML_{1+4}$(100° C.) 75 and containing 1.7 wt % of the silane compound. Prepared by blending 100 parts by weight of the ethylene-propylene copolymer rubber (C₀) with 0.2 part by weight of benzoyl peroxide, 2 parts by weight of vinyltrimethoxysilane and 0.05 part by weight of antioxidant tetrakis[methylene-3-(3,5-di-t-butyl-4-hydroxyphenyl)propionate]methane for 2 minutes using a mixer, followed by melt-mixing the mixture with an extruder (40 mm in diameter and L/D 25) at 190° C.

While the invention has been described in detail and with reference to specific embodiments thereof, it will be apparent to one skilled in the art that various changes and modifications can be made therein without departing from the spirit and scope thereof.

What is claimed is:

1. A process for producing a crosslinked product of a propylene resin which comprises: exposing a composition comprising
   (A) 60 to 90 wt % of a modified propylene resin which is prepared by grafting onto a propylene resin an ethylenically saturated silane compound represented by the formula

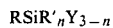
   $$RSiR'_nY_{3-n}$$

wherein R is an ethylenically unsaturated hydrocarbon group or a hydrocarbon oxy group, R' is an aliphatic saturated hydrocarbon group, and Y is a hydrolyzable organic group and n is 0, 1 or 2;
   (B) 20 to 5 wt % of an ethylene resin; and
   (C) 20 to 5 wt % of an ethylene-α-olefin copolymer rubber, to water or steam in the presence of a silanol condensation catalyst to crosslink the composition.

2. A process as claimed in claim 1, wherein said proplyene resin has a melt flow index of 0.7 g/10 min. or less.

3. A process as claimed in claim 1, wherein said propylene resin has a melt flow index of 0.3 g/10 min. or less.

4. A process as claimed in claim 1, wherein said ethylenically unsaturated silane compound is selected from the group consisting of vinyltriacetoxysilane and γ-methacryloyloxypropyltrimethoxysilane.

5. A process as claimed in claim 1, wherein said ethylenically unsaturated silane compound is represented by the formula $$CH_2=CHSi(OA)_3$$

wherein A is a hydrocarbon group having 1 to 8 carbon atoms.

6. A process as claimed in claim 5, wherein said ethylenically unsaturated silane compound is selected from the group consisting of vinyltrimethoxysilane and vinyltriethoxysilane.

7. A process as claimed in claim 1, wherein the modified propylene resin contains 0.001 to 10 wt % of the ethylenically unsaturated silane compound.

8. A process as claimed in claim 1, wherein the modified propylene resin contains 0.01 to 10 wt % of the ethylenically unsaturated silane compound.

9. A process as claimed in claim 1, wherein the modified propylene resin contains 0.5 to 5 wt % of the ethylenically unsaturated silane compound.

10. A process as claimed in claim 1, wherein the ethylene resin has a density of 0.930 g/cm² or more.

11. A process as claimed in claim 1, wherein the ethylene resin has a density of 0.945 g/cm² or more.

12. A process as claimed in claim 1, wherein said ethylene-α-olefin copolymer rubber is selected from the group consisting of an ethylene-propylene rubber, an ethylene-propylene-diene rubber, an ethylene-butene-1 rubber and an ethylene-butene-1-diene rubber.

13. A process as claimed in claim 1, wherein at least one of the ethylene resin and ethylene-α-olefin copolymer rubber is graft-modified with the ethylenically unsaturated silane compound.

14. A process as claimed in claim 1, wherein the amounts of the modified propylene resin, ethylene resin and ethylene-α-olefin copolymer rubber are 70 to 88 wt %, 15 to 7 wt %, and 15 to 5 wt %, respectively.

15. A process as claimed in claim 1, wherein the crosslinked product of the propylene resin has a gel content of 50% or more.

16. A process as claimed in claim 1, wherein the amount of the silanol condensation catalyst is 0.001 to 10 parts by weight per 100 parts by weight of the modified propylene resin.

17. A process as claimed in claim 1, wherein the amount of the silanol condensation catalyst is 0.01 to 5 parts by weight per 100 parts by weight of the modified propylene resin.

18. A crosslinked polypropylene resin composition comprising:

(A) 60 to 90 wt % of modified polypropylene resin obtained by grafting onto a polypropylene resin an ethylenically unsaturated silane compound represented by the formula $$RSiR'_nY_{3-n}$$

wherein R is an ethylenically unsaturated hydrocarbon group or a hydrocarbon oxy group, R' is an aliphatic saturated hydrocarbon group, and Y is a hydrolyzable organic group and is 0, 1 or 2;
(B) 20 to 5 wt. % of an ethylene resin; and
(C) 20 to 5 wt. % of an ethylene-α-olefin copolymer rubber, wherein said composition has been exposed to water or steam in the presence of a silanol condensation catalyst to effect the crosslinking thereof.

19. The crosslinked polypropylene resin composition as claimed in claim 18 wherein said polypropylene resin has a melt flow index of 0.7 g./10 min. or less.

20. The crosslinked polypropylene resin composition as claimed in claim 18 wherein said propylene resin has a melt flow index of 0.3 g./10 min. or less.

21. The crosslinked polypropylene resin composition as claimed in claim 18 wherein said ethylenically unsaturated silane compound is selected from the group consisting of vinyltriacetoxysilane, γ-methacryloyloxypropyltrimethoxysilane, vinyltrimethoxysilane and vinlytriethyoxysilane.

22. The crosslinked polypropylene composition as claimed in claim 18, wherein the modified propylene resin contains 0.001 to 10 wt. % of the ethylenically unsaturated silane compound.

23. The crosslinked polypropylene resin composition as claimed in claim 18, wherein the ethylene resin has a density of 0.930 g./cm.² or more.

24. The crosslinked polypropylene resin composition as claimed in claim 18, wherein said ethylene-α-olefin copolymer rubber is selected from the group consisting of an ethylene-propylene rubber, an ethylene-propylene-diene-rubber, and ethylene-butene-1 rubber and an ethylene-butene-1-diene rubber.

25. The crosslinked polypropylene resin composition as claimed in claim 18, wherein at least one of the ethylene resin and ethylene-α-olefin copolymer rubber is graft-modified with the ethylenically unsaturated silane compound.

26. The crosslinked polyproplene resin composition as claimed in claim 18, wherein the amounts of the modified propylene resin, ethylene resin and ethylene-α-olefin copolymer rubber are 70 to 88 wt. %, 15 to 7 wt. % and 15 to 5 wt. %, respectively.

* * * * *